Figure 1:
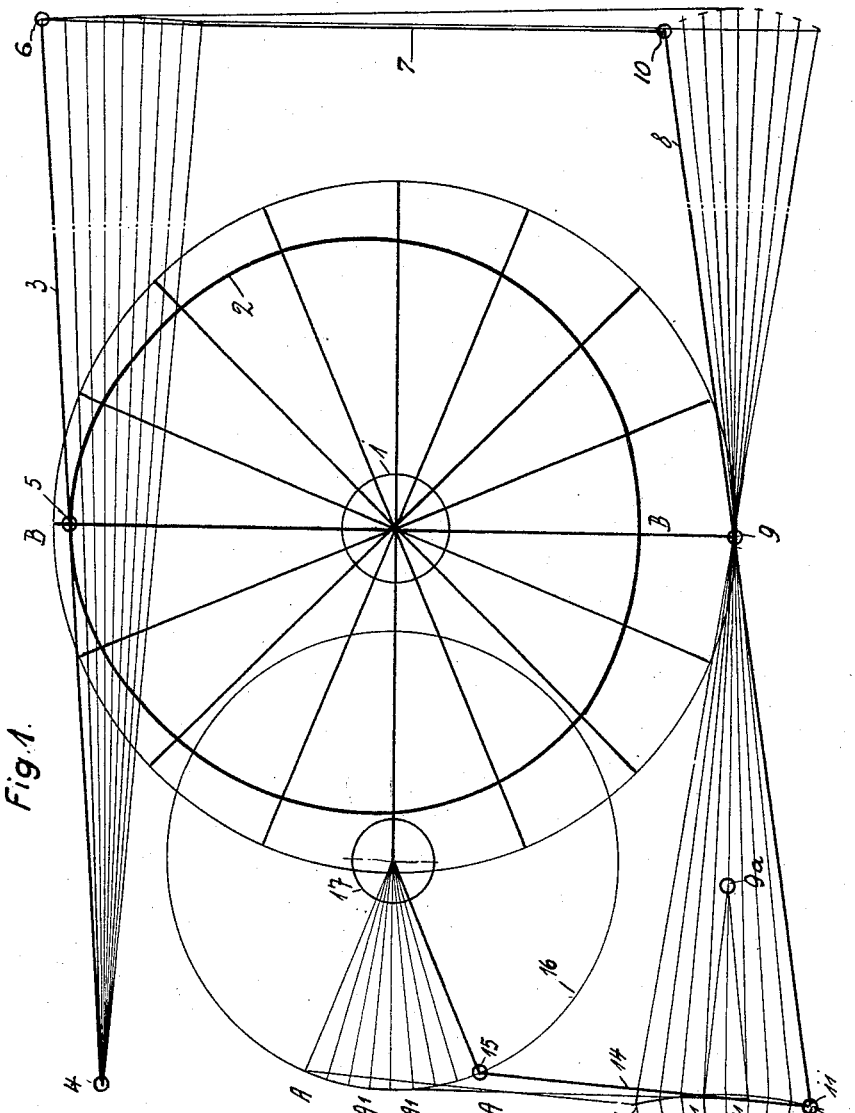

Inventors
JEAN DAP,
ERNST ROGGATZ
by Arthur J. Stephens
Attorney.

Aug. 16, 1932.  J. DAP ET AL  1,871,961
CHANGE SPEED GEAR
Filed June 9, 1927  3 Sheets-Sheet 3
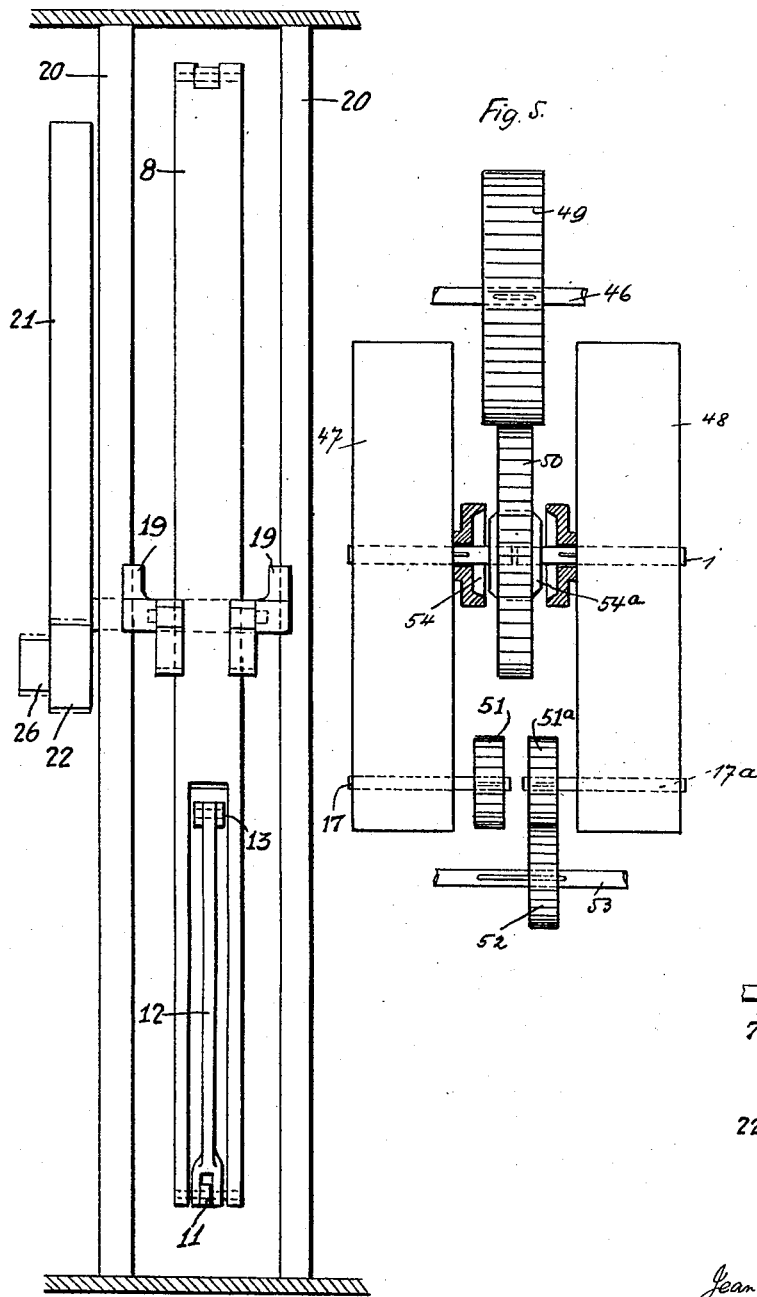
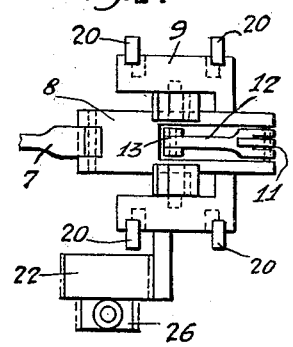
INVENTORS.
Jean Dap and Ernst Roggatz
by Arthur J. Rushman
Attorney.

Patented Aug. 16, 1932

1,871,961

UNITED STATES PATENT OFFICE

JEAN DAP, OF PUTEAUX, FRANCE, AND ERNST ROGGATZ, OF ESSEN, GERMANY, ASSIGNORS TO ARTHUR LANGE, OF COLOGNE-HOLWEIDE, SIEDLUNG IDDELSFELD, GERMANY

CHANGE SPEED GEAR

Application filed June 9, 1927, Serial No. 197,725, and in Germany November 1, 1926.

The object of the present invention is a gear for transmitting the motion of a uniformly rotating driving shaft to a uniformly rotating driven shaft in which the speed of the driven shaft can be regulated from zero to a desired highest speed. The gear is primarily designed for automobiles. The value in this particular application possessed by a gear with continuously variable speed without shock and without uncoupling of the motor, is obvious. Owing to its ability of transmitting zero speed in certain circumstances, such a gear can be used as a direct coupling without a clutch.

According to the invention the movement of the driving shaft is uniformly transmitted by a mechanism to the driven shaft through a connecting gear, by the connecting gear being given a uniform angular speed by the last member of the mechanism, while the steady and continuous speed change is effected by sliding the fulcrum of a transmission member of the mechanism.

In the practical embodiment of this inventive idea the rotation of the driving shaft is transmitted preferably to a lever mechanism with swinging movement and from this through a connecting gear again as rotation to the driven shaft. The last member of the lever mechanism takes the connecting wheel in train in one direction of swing, say by engagement of a pawl in ratchet teeth or by the entrance of spring loaded plungers into corresponding holes in the connecting wheel, while in the opposite direction of swing, the lever swings back out of engagement with the connecting wheel. At least two levers and preferably more, say four at 90° apart, coact with the connecting wheel in order to effect continuous movement. By this is to be understood that not several final members of one lever system, but several lever systems are arranged side by side, which are actuated either from several cam curves or from a single cam curve, which in the latter case must be specially set out for actuating several lever systems. The connecting wheel is locked against being moved in the opposite direction to the rotation caused by the connecting lever by any force acting in the opposite direction to the motor direction of rotation, and also against movement at a higher speed than desired. Such a force (say during downhill or uphill running by an automobile fitted with the gear) must act on the lever mechanism. Owing to the peculiar character of the transmission of the movement from the driving shaft to the first transmission member such a force only shows itself as a pressure in the gear, without the member being able to rotate counter to its normal direction or more rapidly than intended. In consequence of this locking of the gear, any desired degree of braking action even complete stoppage with the motor running can be produced by lowering the speed ratio. The transmission of the motor power to the first transmission member is effected by a roller or the like on the transmission member rolling or sliding in a curved guideway formed in an eccentric disc mounted on the motor shaft, the transmission member thus being given a swinging movement. This curved guideway is so shaped that the connecting wheel moves equal distances in equal times. For this purpose the profile of the curved guideway must be set out by working back, so as to give absolutely uniform motion of the last transmission member. It must not be forgotten that to obtain absolutely uniform secondary motion a definite time for coupling the engaging mechanism must be provided. If the pivotal drive is not to cease during the coupling periods, then at least two mechanisms must be provided, the movements of which during the change overlap for a short distance. For these reasons it is impossible to use two coupling members spaced apart on the connecting wheel and operated by one swinging member. The working curve must overlap a little for both mechanisms. If as set out by way of example above, four lever systems are used, the connecting movements always overlap by a half. With more or less than four lever systems the overlap periods are correspondingly regulated. This overlapping must not be compared with the parallel connection of several mechanisms, as has often been proposed, in order to obtain an approximately uniform motion by the overlapping of several sine curves.

To change the speed the fulcrum of a two armed lever of the gear is movable say by carrying this fulcrum on a sliding member which can be moved to and fro in a guideway from without by a rack gear. In this way the ratio of the lengths of the two arms of the lever, and therewith the speed of the power delivery end of the lever, can be varied, while the end point of the power receiving arm of the lever is always moved with the same speed assuming the primary speed does not change.

Figure 3:
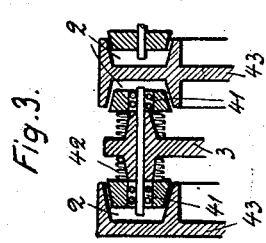
Figure 4:
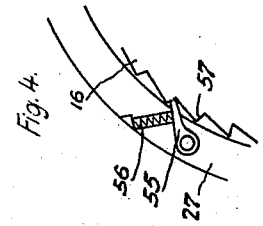
Figure 2:
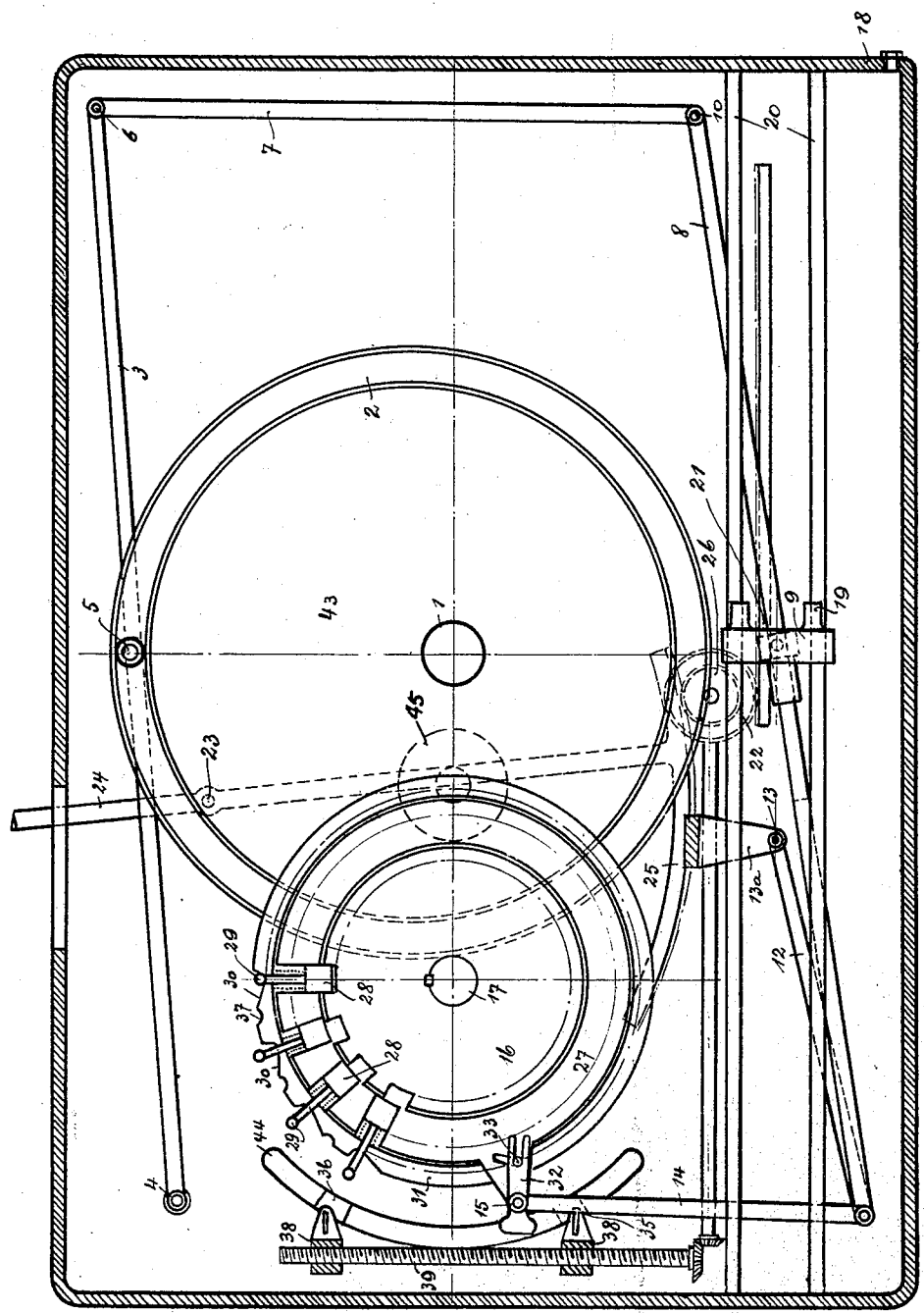

In the accompanying drawings Figure 1 is a diagram showing the motion conditions of Figure 2; Figure 2 is a diagrammatic view of an example embodying the invention; Figure 2a is an end view of the lower part of Figure 2 showing the sliding fulcrum construction; Figure 2b is a plan view of Figure 2a; Figure 3 is a detail section of the cam following roller; Figure 4 is a detail of an alternative one way clutch and Figure 5 is a diagrammatic view of a reverse gear arrangement. Figure 1 shows the conditions of motion of the gear illustrated in Figure 2. In Figure 1, 1 is the driving shaft, 2 the cam disc. The lever 3 has its end point 4 fixed in position and works with the point 5 in the disc 2, so that its end point 6 swings to and fro.

This movement is transmitted by rod 7 to lever 8, which swings about the point 9. Its end points 10 and 11 therefore have a swinging movement. At the point 11 is pivoted the lever 12 which has its end point 13 fixed in position and thus prevents indeterminate sliding of the lever 8. The motion of the point 11 is transmitted to the rod 14 which co-acts with its end point 15 with the connecting wheel 16. The connecting wheel is fast on the driven shaft 17. It will be observed that the lever or link 12 forms a guide independent of the position of the adjustable fulcrum 9 for the pivotal connection 11 between the lever 8 and the rod 14 forming the final transmission member. It will further be observed that the lever 8 as defined by the points 10, 9, 11 is straight and that when the lever 8 is in mid position the lever 12 is in this straight line, while the member 3 and point 15 are also in their mid positions at this instant; further the fulcrum 9 is adjusted along this mid position line, so that whatever the position of the fulcrum 9, the mid position of the parts is constant, and for all adjustments of the fulcrum the lever 8 and the point 15 will move equal distances to either side of the mid position during each oscillation of the lever. It will also be observed that in the example illustrated the members 3 and 8 and the radius passing through 15 are all parallel when in mid position while at this instant the member 14 is perpendicular to the lever 8. In the illustrated example a speed reduction ratio from shaft 1 to shaft 17 of 4:1 has been assumed. The movement of the point 15 over the eighth of a circle A—A corresponds therefore to a half revolution 9 of the motor shaft 1 and the guide groove 2, while equal parts of the circular arc A—A are equivalent to equal angular stages of the curve B—B of the guide groove 2 so that uniform rotation of the shaft 1 must produce uniform rotation of the shaft 17 with a speed reduction of 4:1. Since lever 8, owing to the circular motion C—C of the point 11 about the point 13, slides slightly, the pivot point 9 must be in the form of a slidable bearing. If now point 9 is moved, say to 9a, the point 11 describes a shorter path C'—C' so that the point 15 also describes a smaller arc A'—A', that is the speed of the shaft 17 will be less. The speed can be reduced to zero, that is until the points 9 and 11 coincide.

The references 1 to 17 of Figure 2 correspond exactly to those of Figure 1 except that point 13 is on the opposite side of rod 14. The gear is carried in a housing 18. The pivot 9 in the form of a sliding bearing and provided with guide surfaces 19 bearing on guide rails 20. Facing the upper rail is a rack 21 with which meshes a wheel 22. By adjustment of a lever 24 pivoted at 23 and having at its lower end a toothed segment 25 meshing with a toothed wheel 26 on a shaft 40, the point 9 can be moved and the speed thus changed.

The rod 14 co-acts at the point 15 with a ring 27 lying round the connecting wheel 16. The ring 27 carries a large number of spring loaded plungers 28 which co-act with holes in the connecting wheel 16. The separation of the plungers is not exactly equal to the separation of the holes, so that at almost any instant a plunger can spring into a hole. In order to unlock the connection between connecting wheel 16 and ring 27 during the return of the rod 14, the plungers 28 have pins 29 at their upper ends which rest during the engagement in recesses 30 on a ring 31. This ring 31 is moved in train with the ring 27, by a lever 32 enclosing a pin 33 on the ring 31. This lever 32 is rotatable about the point 15 and carries at its outer end a hammer 34 which strikes abutments 35 and 36 at the extreme positions of the point 15, and is thus rotated and moves the ring 31 relatively to the ring 27. When the hammer 34 strikes the upper abutment 36 the pins 29 slide out of the recesses 30 into grooves 37, when the hammer strikes the lower abutment 35 the action is reversed. The distance between the abutments 35 and 36 must be accurately proportioned to the motion of the point 15 corresponding to the speed for the time being. For this purpose the abutments are guided in a curved guide 44 and are moved towards or from one another by two arms 38.

These arms are moved towards or from one another by rotation of a spindle 39 having right and left handed threads on it. The rotation of the spindle is derived from the shaft 40. In order to allow a motor vehicle fitted with the gear to be moved with the motor at rest, some additional device must be provided in order to maintain the connecting wheel entirely out of engagement with the plunger ring, that is all the plungers must be raised.

Figure 3 shows an advantageous construction of the point 5. The ball borne rollers 41 of the lever 3 are pressed into the guide grooves 2 of the discs 43 by springs 42, so that constant firm contact between the rollers and guide grooves is ensured. Reversal of rotation for example for forward and backward travel is effected through spur gearing 45 or through bevel gears or the like.

To effect reversal there can instead be provided two gears side by side, one for forward driving and the other for backward. This possibility is illustrated purely diagrammatically in Figure 5, in which 46 is the motor shaft, 47 and 48 are the two gears, 53 is the shaft to be driven forward or backward. On the motor shaft is keyed the toothed wheel 49. This meshes with the toothed wheel 50 which is slidable axially on the primary shafts 1 of the gears 47 and 48. The wheel 50 carries on opposite sides the half parts of two friction clutches 54, 54a, the mating halves of which are keyed on the primary shafts 1. By sliding the wheel 50 one way or the other it is clutched to one gear or the other and the corresponding secondary shaft 17 or 17a is driven at a speed depending on the setting of the gear and in the direction corresponding to the gear in use. The wheel 49 is wide enough to remain in mesh with wheel 50 at all times. The secondary shafts 17, 17a carry respective toothed wheels 51, 51a with either of which can mesh a toothed wheel 52 slidably keyed to the final driven shaft 53. The wheels 50 and 52 are moved together so that the wheel 52 is meshed with that gear 47, or 48 to which the wheel 50 is clutched. In this way the shaft 53 can be driven forwards or backwards at choice. In the mid-position of the gear 50 both gears are out of connection with the motor shaft. The gear 52 is also slidable so that it can be coupled with either gear. When this gear is in its central position both gears are disconnected, as is necessary for example when the vehicle is to be pushed.

If the braking action is not required, instead of the described connecting gear a simple ratchet wheel drive can be used comprising a pawl 55 and spring 56 mounted on the ring 27 and coacting with ratchet teeth 57 on the connecting wheel 16 as indicated in Figure 4. Instead of the lever mechanism, an eccentric mechanism can be used in which the speed is changed by altering the eccentricity of an eccentric. The driven shaft 17 according to the motor speed and the most used speed instead of being directly driven, can be rotated through a tooth wheel gear from the connecting wheel. It is again emphasized that the illustrated gear is only an example embodying the invention.

The essence of the invention lies not in the constructional embodiment but particularly in the fact that with a steady primary speed a uniform secondary motion is obtained.

What we claim is:—

1. In a speed change gear of the class wherein the speed ratio can be changed continuously from zero to a desired maximum, a primary shaft, a cam rotated by said primary shaft, a main lever connected to and oscillated by said cam, a secondary shaft, a connecting wheel on said secondary shaft having a series of slots in its periphery, a member loosely mounted co-axially on said connecting wheel and connected to and oscillated by said lever, a series of spring plungers carried by said oscillatory member at a spacing different from that of the slots in the said connecting wheel, and means for causing said plungers to co-act with said connecting wheel in one direction of movement and holding them back in the other direction.

2. In a speed change gear of the class wherein the speed ratio can be changed continuously from zero to a desired maximum, a primary shaft, a cam rotated by said primary shaft, a main lever connected to and oscillated by said cam, a secondary shaft, a connecting wheel on said secondary shaft having a series of slots in its periphery, a member loosely mounted co-axially on said connecting wheel and connected to and oscillated by said lever, a series of spring plungers carried by said oscillatory member at a spacing different from that of the slots in the said connecting wheel, a cam track loosely mounted co-axially on said oscillatory member co-operating with said plungers and adapted to raise them when moved in one direction relative to said oscillatory member and release them when moved in the opposite direction, and means for moving said cam track relatively to said oscillatory member at the extreme points of oscillation.

3. In a speed change gear of the class wherein the speed ratio can be changed continuously from zero to a desired maximum, a primary shaft, a cam rotated by said primary shaft, a main lever connected to and oscillated by said cam, a secondary shaft, a connecting wheel on said secondary shaft having a series of slots in its periphery, a member loosely mounted co-axially on said connecting wheel and connected to and oscillated by said lever, a series of spring plungers carried by said oscillatory member at a spacing different from that of the slots in the said connecting wheel, a cam track loosely mounted co-axially on said oscillatory member co-operating with said plungers and adapted to raise them when moved in one direction relative to said oscillatory member and release them when moved in the opposite direction, a hammer lever pivoted to said oscillatory member and by an arm to said cam track, and abutments positioned so that they are struck by the hammer end of said hammer lever in the extreme positions of said oscillatory member.

4. In a speed change gear of the class wherein the speed ratio can be changed continuously from zero to a desired maximum, a primary shaft, a cam rotated by said primary shaft, a main lever connected to and oscillated by said cam, means for adjusting the fulcrum of said lever, a secondary shaft, a connecting wheel on said secondary shaft having a series of slots in its periphery, a member loosely mounted co-axially on said connecting wheel and connected to and oscillated by said lever, a series of spring plungers carried by said oscillatory member at a spacing different from that of the slots in the said connecting wheel, a cam track loosely mounted co-axially on said oscillatory member co-operating with said plungers and adapted to raise them when moved in one direction relative to said oscillatory member and release them when moved in the opposite direction, a hammer lever pivoted to said oscillatory member and by an arm to said cam track, a pair of abutments mounted to move in the path of the hammer end of said hammer lever and means for adjusting the positions of said abutments in correspondence with the adjustment of the fulcrum of said main lever.

5. In a speed change gear of the class wherein the speed ratio can be changed continuously from zero to a desired maximum, a framework for the parts of the gear, a primary shaft borne in said framework, a pair of discs connected to and rotated by said primary shaft having juxtaposed cam grooves with inclined sides formed in the opposite faces thereof, an arm pivoted to said framework, a spindle on said arm, a truncated conical roller in each said cam groove pivoted on the free end of said spindle, spring means for forcing said rollers apart into said cam grooves, means connected to and operated by said arm for converting the rotary primary motion of said cam into oscillatory motion, means for converting the oscillatory motion into rotary secondary motion, said cam being set out so that a uniform ratio is maintained.

6. A speed change gear comprising a pair of gears of the class wherein the speed ratio can be changed continuously from zero to a desired maximum, operating in opposite directions mounted with their primary and secondary shafts co-axial, a source of primary motion, means for operatively connecting either of said primary shafts to said source of primary motion, a final secondary shaft and means for operatively connecting either of said secondary shafts to said final secondary shaft.

7. A speed change gear comprising a pair of gears of the class wherein the speed ratio can be changed continuously from zero to a desired maximum, operating in opposite directions mounted with their primary and secondary shafts co-axial, a half friction clutch on each of said primary shafts, a gear wheel mounted to slide between said half clutches, a complementary half clutch secured on each side of said gear wheel, a primary motion shaft, a second gear wheel on said primary motion shaft in constant mesh with said first gear wheel, a pinion on each secondary shaft, a final secondary shaft, and a final gear wheel on said final secondary shaft adapted to be meshed with either of said pinions.

8. In a speed change gear of the class wherein the speed ratio can be changed continuously from zero to a desired maximum, a primary shaft, a cam rotated by said primary shaft, oscillating mechanism actuated by said cam, means for adjusting the amplitude of oscillatory motion, a secondary shaft, a connecting member on said secondary shaft, a final transmission member actuated by said oscillating mechanism and having one way connection with said connecting member on the secondary shaft, and means for guiding said final transmission member and for always moving it equal distances on either side of a fixed mid point over a fixed path, said cam being set out so that the secondary motion is of a constant character for all ratio settings.

9. In a speed change gear of the class wherein the speed ratio can be changed continuously from zero to a desired maximum, a primary shaft, a cam rotated by said primary shaft, a lever connected to and oscillated by said cam, means for adjusting the fulcrum of said lever, a secondary shaft, a connecting wheel on said secondary shaft, a coupling member pivoted to said lever, a one-way clutch on said coupling member coacting with said connecting wheel, and means for guiding the pivotal connection between said coupling member and said lever independently of the position of said adjustable fulcrum, said cam being set out so as to produce a uniform secondary motion in all positions of said adjustable fulcrum.

10. In a speed change gear of the class wherein the speed ratio can be changed continuously from zero to a desired maximum, a primary shaft, a cam rotated by the primary shaft, a lever connected to and oscillated by said cam, means for adjusting the fulcrum of said lever, a secondary shaft, a connecting wheel on said secondary shaft, a coupling member pivoted to said lever, a positive connection coming into action in one direction between said coupling member and said connecting wheel, and means for guiding the pivotal connection between said coupling member and said lever independently of the position of said adjustable fulcrum, said cam being set out so as to produce a uniform secondary motion in all positions of said adjustable fulcrum.

11. In a speed change gear of the class described, a primary shaft, a cam rotated by said primary shaft, a lever connected to and oscillated by said cam, means for adjusting the fulcrum of said lever along a path such that the mid position of the lever remains constant, a secondary shaft, a connecting wheel on said secondary shaft, a one way clutch co-acting with said connecting wheel, a final transmission member pivoted at opposite ends respectively to one end of said lever and to said one way clutch, said final transmission member being perpendicular to said lever when the latter is in mid position, and a link pivoted at one end to said lever and at the other end to a point in line with said lever when the latter is in mid position.

12. In a speed change gear of the class described, a primary shaft, a cam rotated by said primary shaft, a member oscillated by said cam, a lever connected to and oscillated by said cam oscillated member, means for adjusting the fulcrum of said lever along a path such that the mid position of the lever remains constant, a secondary shaft, a connecting wheel on said secondary shaft, a one way clutch co-acting with said connecting wheel, a final transmission member pivoted at opposite ends respectively to one end of said lever and to said one way clutch, the end of said final transmission pivoted to said one way clutch, said cam oscillated member and said lever being arranged so that all pass through their mid positions at the same instant, and a link pivoted at one end to said lever and at the other end to a point in line with said lever when the latter is in mid position.

13. In a speed change gear of the class described, a primary shaft, a cam rotated by said primary shaft, a member oscillated by said cam, a lever connected to and oscillated by said cam oscillated member, means for adjusting the fulcrum of said lever along a path such that the mid position of the lever remains constant, a secondary shaft, a connecting wheel on said secondary shaft, a one way clutch co-acting with said connecting wheel, a final transmission member pivoted at opposite ends respectively to one end of said lever and to said one way clutch, the radial line from the centre of the secondary shaft to the pivotal connection between said one way clutch and said final transmission member, said cam oscillated member, and said lever all being parallel when in mid position, and a link pivoted at one end to said lever and at the other end to a point in line with said lever when the latter is in mid position.

In testimony whereof we have signed our names to this specification.

JEAN DAP.
ERNST ROGGATZ.